«12» United States Patent
Reilly et al.

«10» Patent No.: US 10,221,084 B1
«45» Date of Patent: Mar. 5, 2019

«54» HEADWORKS AND DEWATERING

«75» Inventors: James P. Reilly, Vancouver, WA (US);
Victoria Jelderks, Vancouver, WA (US)

«73» Assignee: Liberty Evans, LLC, Vancouver, WA (US)

«*» Notice: Subject to any disclaimer, the term of this patent is extended or adjusted under 35 U.S.C. 154(b) by 1016 days.

«21» Appl. No.: 13/605,382

«22» Filed: Sep. 6, 2012

Related U.S. Application Data

«60» Provisional application No. 61/531,552, filed on Sep. 6, 2011.

«51» Int. Cl.
*C02F 3/02* (2006.01)
*C02F 1/00* (2006.01)

«52» U.S. Cl.
CPC ............ *C02F 3/02* (2013.01); *C02F 1/006* (2013.01); *C02F 2001/007* (2013.01)

«58» Field of Classification Search
CPC ....... C02F 1/006; C02F 2001/007; C02F 3/02
USPC ............ 210/170.03, 170.08, 336, 455, 477
See application file for complete search history.

«56» References Cited

U.S. PATENT DOCUMENTS

| | | | |
|---|---|---|---|
| 3,772,193 A | 11/1973 | Nelli et al. | |
| 5,545,325 A * | 8/1996 | Hsu | B01D 21/2416 210/195.3 |
| 5,707,513 A * | 1/1998 | Jowett | C02F 3/02 210/150 |
| 6,086,758 A * | 7/2000 | Schilling | B01D 29/23 210/164 |
| 6,383,372 B1 * | 5/2002 | Houck | B01D 24/042 210/150 |
| 6,393,775 B1 | 5/2002 | Staschik | |
| 7,153,436 B2 * | 12/2006 | Bair | B01D 21/0018 209/5 |
| 7,210,594 B2 | 5/2007 | Schütz | |
| 7,267,235 B2 * | 9/2007 | Sharir | B01D 29/23 210/109 |
| 7,288,192 B2 | 10/2007 | Jowett | |
| 7,666,285 B1 | 2/2010 | Cho et al. | |
| 9,669,330 B1 | 6/2017 | Reilly et al. | |

(Continued)

OTHER PUBLICATIONS

"U.S. Appl. No. 13/605,365, Final Office Action dated Aug. 13, 2015", 15 Pgs.
"U.S. Appl. No. 13/605,365, Non Final Office Action dated Dec. 5, 2014", 15 pgs.
"U.S. Appl. No. 13/605,365, Response filed May 5, 2015 to Non Final Office Action dated Dec. 5, 2014", 11 pgs.

(Continued)

*Primary Examiner* — Kevin Murphy
«74» *Attorney, Agent, or Firm* — Schwegman Lundberg & Woessner, P.A.

«57» ABSTRACT

Embodiments of the invention describe a headworks and dewatering component coupled to an inlet and disposed above a base of the basin, the headworks and dewatering component to include a filtration element to define a flow restriction for solid materials, dewater the solid materials from the wastewater influent, and pass a remainder of the wastewater influent (e.g., to another compartment of a host WWTP container). In one embodiment, the headworks and dewatering component comprises a box shape (i.e., orthogonal polyhedral). In other embodiments, said component may comprise a circular or free-form shape. In one embodiment, the filtration element defines a flow restriction for solid materials based, at least in part, on dimensions of the solid materials. Said filtration element may comprise fabric netting, or metal mesh netting.

24 Claims, 11 Drawing Sheets

(56) References Cited

U.S. PATENT DOCUMENTS

| | | | |
|---|---|---|---|
| 9,828,267 B1 | 11/2017 | Reilly et al. | |
| 2004/0074845 A1* | 4/2004 | Hagino | C02F 11/12 210/718 |
| 2004/0084379 A1 | 5/2004 | Ballard | |
| 2004/0118764 A1 | 6/2004 | Miller et al. | |
| 2005/0150840 A1 | 7/2005 | Vion | |
| 2005/0241174 A1 | 11/2005 | Kolega et al. | |
| 2005/0247609 A1 | 11/2005 | Laing et al. | |
| 2006/0182100 A1 | 8/2006 | Li et al. | |
| 2006/0193467 A1 | 8/2006 | Levin | |
| 2007/0080112 A1 | 4/2007 | Langlais | |
| 2007/0187326 A1 | 8/2007 | Bonnelye et al. | |
| 2007/0215212 A1 | 9/2007 | Demeniuk | |
| 2007/0215531 A1 | 9/2007 | Wawrla et al. | |
| 2008/0104661 A1 | 5/2008 | Levin et al. | |
| 2008/0210093 A1 | 9/2008 | Snowdon | |
| 2009/0114592 A1 | 5/2009 | Lebrun et al. | |
| 2009/0211974 A1 | 8/2009 | Bonnelye et al. | |
| 2009/0236280 A1 | 9/2009 | Morita et al. | |
| 2009/0251529 A1 | 10/2009 | Tucker et al. | |
| 2009/0254670 A1 | 10/2009 | Kim et al. | |
| 2010/0032373 A1 | 2/2010 | Langlais | |
| 2010/0038314 A1 | 2/2010 | Vion et al. | |
| 2010/0200496 A1 | 8/2010 | Graveleau | |
| 2010/0282679 A1 | 11/2010 | Langlais | |
| 2011/0024358 A1 | 2/2011 | Pudvay | |
| 2011/0108497 A1* | 5/2011 | Stigebrandt | B01D 29/23 210/808 |
| 2011/0186512 A1 | 8/2011 | Bonnelye | |
| 2011/0290723 A1 | 12/2011 | Bonnelye et al. | |
| 2012/0055934 A1 | 3/2012 | Reilly et al. | |
| 2012/0111806 A1 | 5/2012 | Langlais et al. | |
| 2013/0001146 A1 | 1/2013 | Mirault | |
| 2013/0056404 A1 | 3/2013 | Malige et al. | |
| 2013/0118966 A1 | 5/2013 | Furuno et al. | |
| 2017/0113955 A1 | 4/2017 | Reilly et al. | |

OTHER PUBLICATIONS

"U.S. Appl. No. 13/605,365, Response filed Nov. 19, 2014 to Restriction Requirement dated Aug. 19, 2014", 6 pgs.

"U.S. Appl. No. 13/605,365, Restriction Requirement dated Aug. 19, 2014", 6 pgs.

"U.S. Appl. No. 13/605,374, Non Final Office Action dated Jun. 18, 2015", 27 pgs.

"U.S. Appl. No. 13/605,374, Response filed Jul. 18, 2016 to Final Office Action dated Feb. 16, 2016", 12 pgs.

"U.S. Appl. No. 13/605,374, Response filed Nov. 6, 2016 to Non Final Office Action dated Jun. 18, 2015", 10 pgs.

"U.S. Appl. No. 13/605,365, Non Final Office Action dated Mar. 3, 2016", 20 pgs.

"U.S. Appl. No. 13/605,365, Notice of Allowability dated Nov. 28, 2016", 11 pgs.

"U.S. Appl. No. 13/605,365, Notice of Allowance dated Nov. 15, 2016", 14 pgs.

"U.S. Appl. No. 13/605,365, Response filed Feb. 15, 2016 to Final Office Action dated Aug. 13, 2015", 11 pgs.

"U.S. Appl. No. 13/605,365, Response filed Aug. 3, 2016 to Non Final Office Action dated Mar. 3, 2016", 13 pgs.

"U.S. Appl. No. 13/605,374, Examiner Interview Summary dated Nov. 12, 2015", 3 pgs.

"U.S. Appl. No. 13/605,374, Final Office Action dated Feb. 16, 2016", 30 pgs.

"U.S. Appl. No. 13/605,374, Non Final Office Action dated Mar. 23, 2017", 14 pgs.

"U.S. Appl. No. 13/605,374, Response filed Jun. 9, 2017 to Non Final Office Action dated Mar. 23, 2017", 11 pgs.

"U.S. Appl. No. 13/605,374, Response filed Jul. 18, 2018 to Final Office Action dated Feb. 16, 2016", 12 pgs.

"U.S. Appl. No. 13/605,374, Response filed Nov. 6, 2015 to Non Final Office Action dated Jun. 18, 2015", 10 pgs.

"U.S. Appl. No. 15/400,203, Preliminary Amendment filed Jan. 11, 2017", 6 pgs.

"U.S. Appl. No. 13/605,374, Notice of Allowance dated Sep. 20, 2017", 7 pgs.

\* cited by examiner

HEADWORKS AND DEWATERING

CLAIM OF PRIORITY

This application claims priority to Provisional Application No. 61/531,552 filed on Sep. 6, 2011.

BACKGROUND

Wastewater treatment plants (WWTPs) are utilized to process and purify water from industrial operations and municipal sources. In current implementations, the capacity of a WWTP is not scalable and its components are custom made for its source. As a result, WWTP components have to be designed to not only accommodate current demand, but any foreseeable increased demand. This increases the cost required to design, construct and maintain the WWTP.

Upon exiting a collection system and entering the WWTP, the first device or group of devices that the wastewater influent encounters is referred to as headworks. Prior art headworks typically include grit chambers, flow measurement devices and flow equalization devices.

Headworks may be combined with a dewatering device such as a screw conveyor (e.g., an Archimedes screw). This arrangement represents a rigid and a heavy construction which, even for relatively short conveying distances, must be property supported at least at both its ends.

In general, such screw conveyor systems are used to lift solids from a collection point in the fluid stream to a discharge point for removal from the system. These systems require mechanized components, which increases system maintenance tasks and costs. They also require daily or weekly inspection and maintenance. Furthermore, screw conveyor systems require additional water pumping and transport, further increasing operating expenses. Finally the form factor of such mechanized headworks and dewatering systems tends to be quite large and substantively increases the WWTP footprint.

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of an apparatus, system and method for performing headworks and dewatering processes in a wastewater treatment plant (WWTP). In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
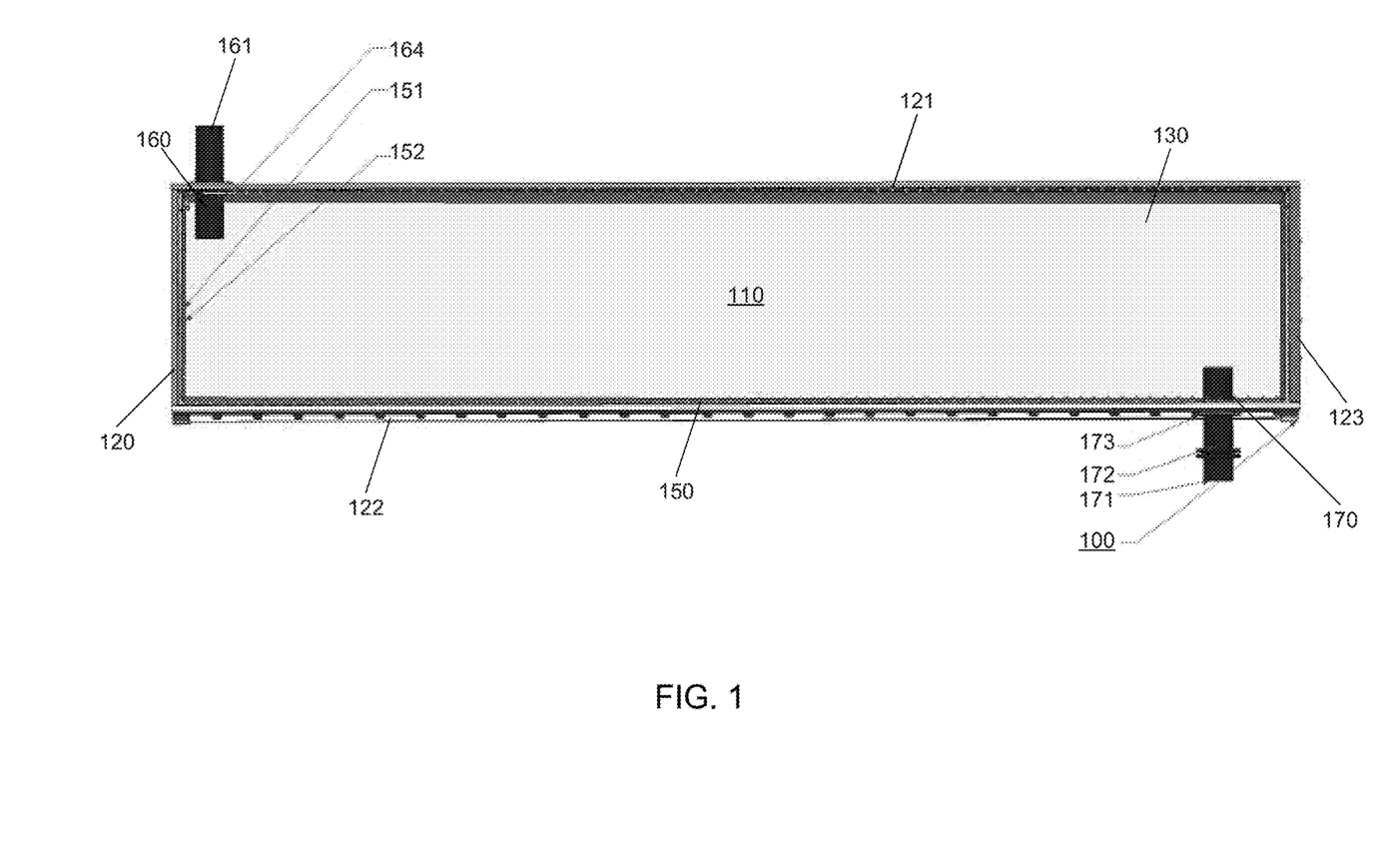
FIG. 1 is a top-view illustration of a modular wastewater treatment container according to an embodiment of the disclosure.

FIG. 1 is a top-view illustration of a modular wastewater treatment container according to an embodiment of the disclosure. In this embodiment, intermodal container 100 is consistent with any International Organization for Standardization (ISO) specification for intermodal containers (e.g., Technical Specification for Steel Dry Cargo Container, Spec. No. ITRU-40'-SA, June. 12, 2001)—e.g., container 100 may be a steel dry cargo container ISO IAA type 40'×8'×8'6" or 20'×8'×8'6". In this embodiment, the interior of container 100 forms basin 110 (and thus, the terms "container" and "basin" is used interchangeably herein to describe a similar structure). In other embodiments, a wastewater treatment basin may be included in container 100, but said basin's shape and volume may be independent of the dimensions of container 100.

FIG. 1 illustrates container 100 from a "top view," thus illustrating side walls 120-123 and gravitational bottom (i.e., base) 130. It is to be understood that references to "side walls" and "gravitational bottom" are used simply to distinguish the sides of the containers of the example embodiment. In other embodiments of the invention, the orientation of a container including a wastewater treatment basin may be such that a different side of the container is the "gravitational bottom."

Lining portions of the interior of container 100 with a corrosion resistant liner may form a basin to hold wastewater process material. In this embodiment, basin 110 is formed by lining the interior of container 100 with corrosive resistant liner 150. Liner 150 may comprise at least one layer of polyvinyl chloride (PVC), Low Density Polyethylene (LDPE) or High Density Polyethylene (HDPE) liner. It is to be understood that utilizing an ISO container and said liner material to construct a wastewater treatment basin significantly reduces the costs of said basin compared to materials used in the prior art (e.g., concrete and stainless steel). In one embodiment, liner 150 may be coupled to steel grommets (such as grommet 151), which are further fastened to the steel hooks (such as hook 152) on the inside of container 100. The steel hooks may be welded to the inside of sidewalls 120-123 at the gravitational top of container 100.

Container 100 further includes inlet 160 and outlet 170. In this embodiment, inlet 160 and outlet 170 are two circular holes cut into container sidewalls 121 and 122, respectively, and the corresponding portions of liner 150 to accommodate inlet and outlet pipes 161 and 171. Thus, wastewater flows in and out of the basin 100 via pipes 161 and 171. The inlet and outlet pipes may be secured to sidewalls 121 and 122 of container 100 by welding flanged L shaped pipe rings (e.g., pipe ring 173) to the interior and exterior of said container sidewalls.

It is to be understood that in other embodiments, an inlet and an outlet for the basin may be any opening that allows wastewater treatment process material to enter and exit the basin. Furthermore, it is to be understood that the inlet/outlet of a basin may be a single access point of the basin (e.g., an exposed portion of a gravitational top of a basin may function as both an inlet and an outlet).

Inlet pipe 161 and outlet pipe 171 may each be an HDPE pipe. The HDPE pipes may be inserted into pipe rings and held in place in the pipe rings by attaching the HDPE flanges (e.g., flange 172) to the HDPE pipe using socket fusion welding. HDPE flanges may be attached to a flanged pipe ring (e.g., pipe ring 173) with screws which may be collectively underneath liner 150. The perimeter of inlet 160 and outlet 170 may be secured to their respective HDPE pipes using a rubber gasket and an aluminium fastener (e.g., fastener 164) on the interior side of liner 150.

Container 100 enables a modular design approach for a WWTP by subdividing said systems into smaller parts which may be easily manufactured and transported. For example, in the event increased capacity is desired, additional containers may be inexpensively added to meet the demand. Furthermore, WWTP components according to embodiments of the invention may be independently created and replaced, thereby reducing the labor and costs associated with lifetime maintenance of a WWTP.

Figure 2A:
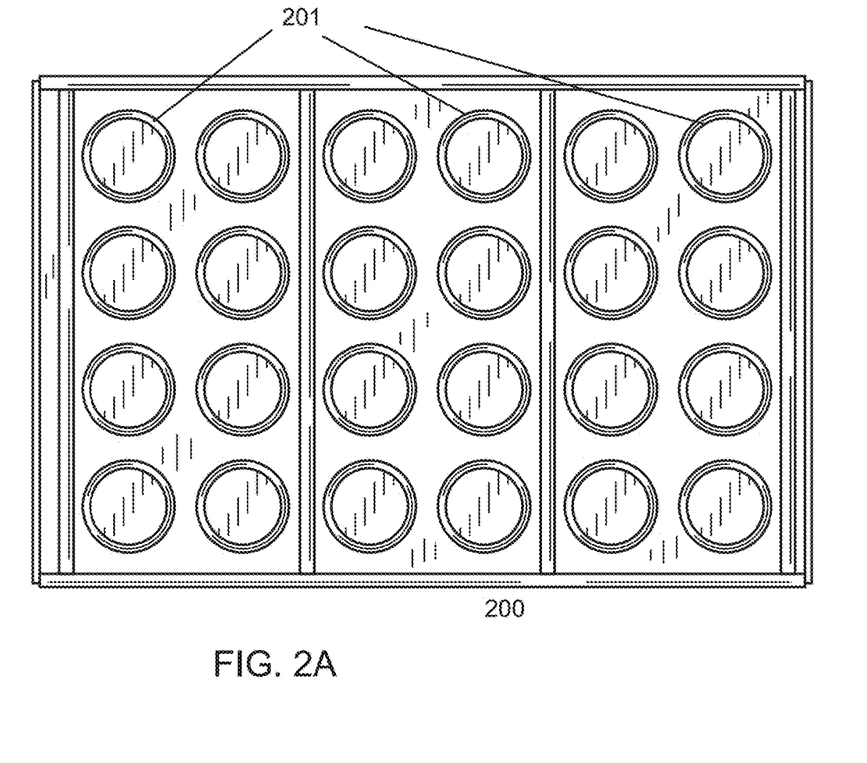
FIG. 2A-FIG. 2C illustrate top and side-views of a headworks and dewatering structure according to an embodiment of the disclosure.
Figure 2B:
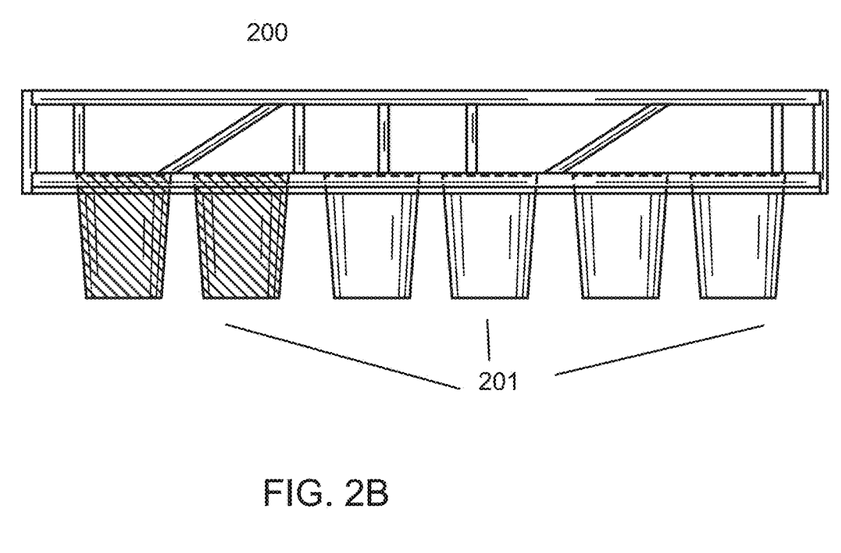
Figure 2C:
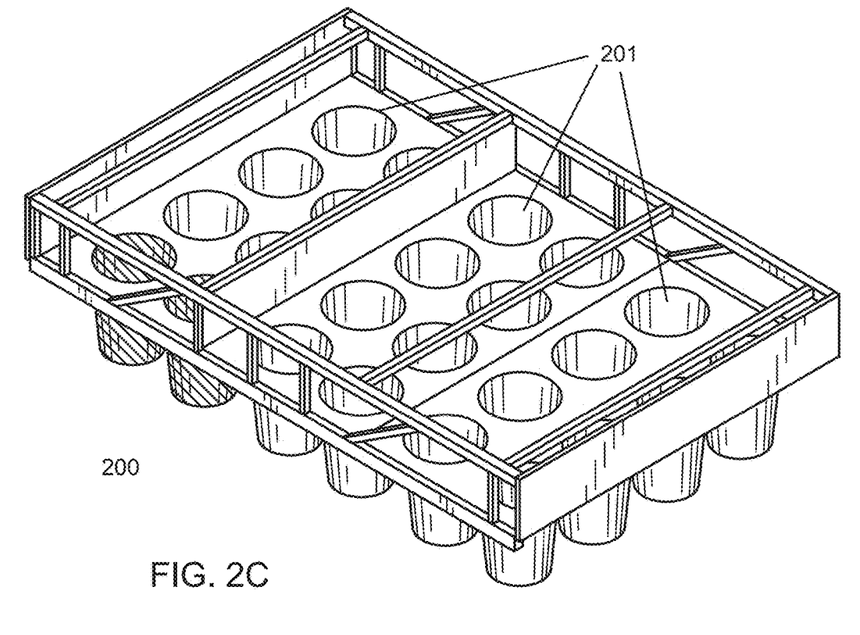

FIG. 2A-FIG. 2C illustrate top and side-views of a headworks and dewatering structure according to an embodiment of the disclosure. Structure 200 functions as both a headworks structure (i.e., the entry point of wastewater for a host WTTP basin) and a dewatering structure (i.e., a structure to reduce the water content of the influent). Furthermore, structure 200 may be a modular component for a host WWTP treatment container, designed to easily be placed/replaced inside or on a WWTP container.

In this embodiment, structure 200 includes plurality of sub-containers 201. Each of said sub-containers may comprise substantially the same shape size, or may vary their respective size and shape. In some embodiments, each of sub-containers 201 may be lined with a removable layer (e.g., soft removable mesh or netting, a paper based filter, etc.). In other embodiments, each of sub-containers 201 are removable, and are each made of porous material (e.g., steel mesh netting).

In this embodiment, sub-containers 201 are each shown to taper towards their gravitational bottom, such that influent flows toward the bottom. In some embodiments, each of sub-containers 201 includes an outlet, but other embodiments may not include an outlet so that water is to flow relatively evenly throughout the porous material.

By having the lining of sub-containers (or the sub-containers themselves) removable, embodiments allow for easy manual removal of accumulated debris for sub-containers 201. Furthermore, the modular design of headworks and dewatering structure 200 allows for efficient inspection, repair, removal and replacement of the component in a host WWTP container. In some embodiments, headworks and dewatering structure 200 is designed to be placed within a host WWTP container, thereby having no effect of the containers structural footprint.

The technical effect of embodiments such as headworks and dewatering structure 200 is the removal of all mechanization components compared to prior art solutions; therefore moving parts and the maintenance requirements of moving parts from a WWTP solution is also removed. This static solution enables a maintainer of the WWTP to leave the WWTP headworks unattended for many months at a time. The cost savings of this "low tech" solution from a maintenance perspective is substantial. By eliminating the requirement of daily/weekly and monthly on site headwork's inspection and maintenance the operating cost of a container based WWTP can be reduce tenfold. Furthermore by utilizing a vacuum truck to 'pump out" the WWTP filtered headwork's debris on a bi-annual basis, one can also perform other routine maintenance.

As discussed above, another key element of the headwork's solution is that it can be placed within the frame of a WWTP container, e.g., the Standard ISO container-based solution of FIG. 1. The advantage of placing the headwork's structure inside as opposed to outside a WWTP container or as a separate unit for the WWTP is that any WWTP utilizing such embodiments can be transported as a normal cargo transport container on trains, container ships and by truck with no additional requirements. This headwork's encapsulation can save many thousands of dollars in installation, upgrade and maintenance transport fees.

FIG. 3A-FIG. 3D illustrate top and side-views of a headworks and dewatering structure according to an embodiment of the disclosure. Said figures illustrate gravity-based solutions for influent filtration and waste activated sludge dewatering according to embodiments of the disclosure. Said figures illustrate, for example, a rectangular structure with influent arriving at the top of structure and filtered water falling out of the bottom of the structure and into a basin residing in an ISO container WWTP basin. The rectangular structure includes steel or some other structural element that supports a filtration element, (either nylon or other fabric netting or metal mess netting) that can hold up to (for example) 12 months of debris that is filtered from water and that can be removed by a separate action at a later date. This net or web of filtered debris is kept in place by the walls of the rectangular structure or a substructure (in some cases the nets reside within porous buckets that are attached to the bottom of the rectangular structure).

Structures 300 and 350 function as both a headworks structure (i.e., the entry point of wastewater for a host WTTP basin) and a dewatering structure (i.e., a structure to reduce the water content of the influent). Furthermore, structures 300 and 305 may be a modular component for a host WWTP treatment container, designed to easily be placed/replaced inside or on a WWTP container.

Figure 3A:
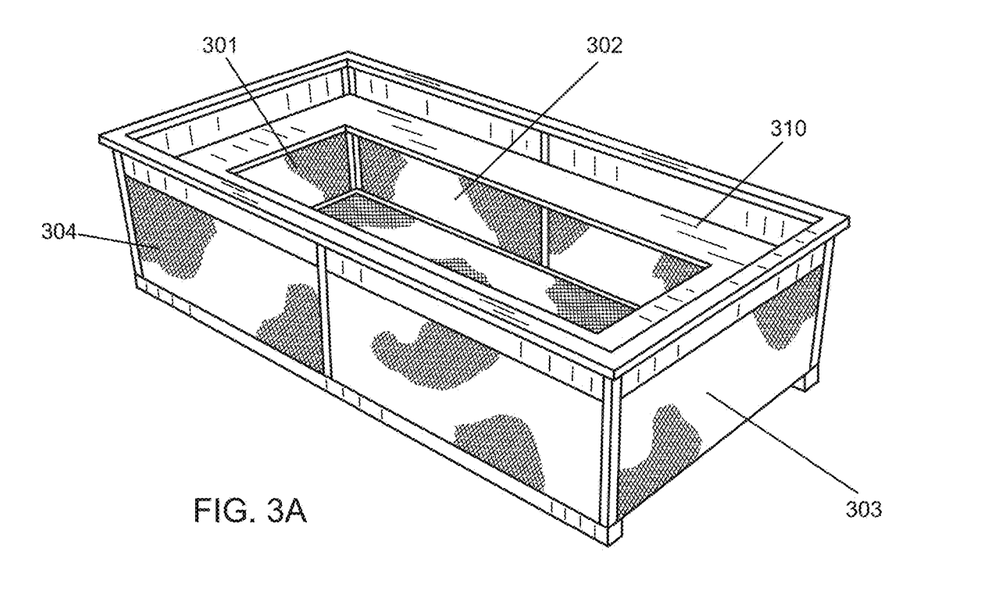
FIG. 3A-FIG. 3D illustrate top and side-views of a headworks and dewatering structure according to an embodiment of the disclosure.
Figure 3B:
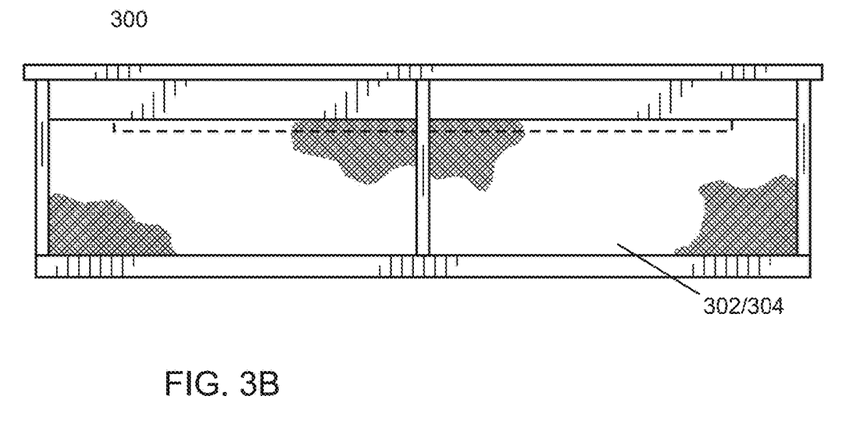
Figure 3C:
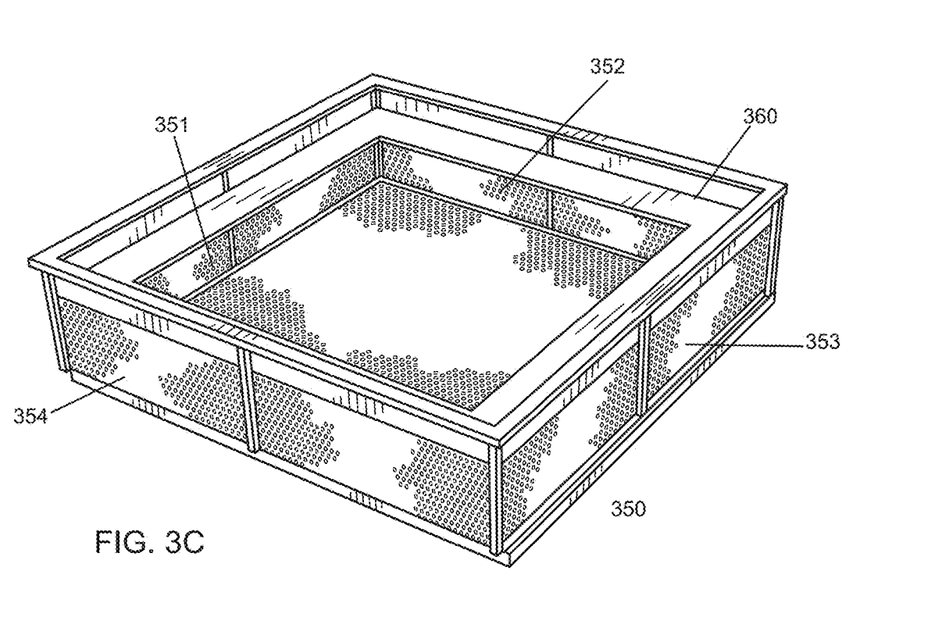
Figure 3D:
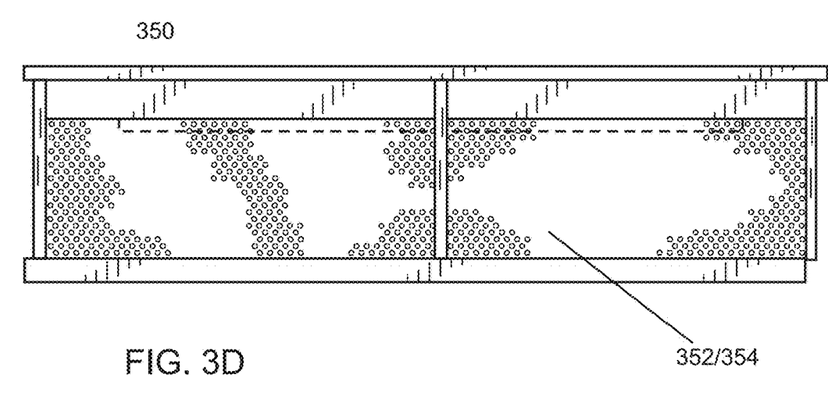

In this embodiment, structures 300 and 350 are shown to comprise a box-shaped structure (e.g., rectangular cube 300, square cube 350, etc.) having an open side and five porous sides. Each of said porous sides may be have substantially the same or different levels of porosity. An example of said porous sides is shown in FIG. 3A as sides 301-305, and in FIG. 3C as sides 351-355. In these illustrations, the porous patterns of said structures are shown in an intermittent pattern in order to clarify the illustrations.

Depending on the installation of structures 30 and 350, any of porous sides may function as the gravitational bottom of the structure (i.e., influent flows toward the bottom). Thus, other embodiments of the invention may comprise any shape having an open/accessible portion and a gravitational bottom portion.

By having open side 310 and 360 of structures 300 and 350, respectively, serving as the inlet of a WWTP container, embodiments allow for easy manual or scheduled removal of accumulated debris. Furthermore, the modular design of headworks and dewatering structures 300 and 350 allows for efficient inspection, repair, removal and replacement of the component in a host WWTP container. In some embodiments, headworks and dewatering structures are designed to be placed within a host WWTP container, thereby having no effect of the containers structural footprint.

The technical effect of embodiments such as headworks and dewatering structures 300 and 350 is the removal of all mechanization components compared to prior art solutions; therefore moving parts and the maintenance requirements of moving parts from a WWTP solution is also removed. This static solution enables a maintainer of the WWTP to leave the WWTP headworks unattended for many months at a time. The cost savings of this "low tech" solution from a maintenance perspective is substantial. By eliminating the requirement of daily/weekly and monthly on site headwork's inspection and maintenance the operating cost of a container based WWTP can be reduce tenfold. Furthermore by utilizing a vacuum truck to 'pump out" the WWTP filtered headwork's debris on a bi-annual basis, one can also perform other routine maintenance.

As discussed above, another key element of the headwork's solution is that it can be placed within the frame of a WWTP container, e.g., the Standard ISO container-based solution of FIG. 1. The advantage of placing the headwork's structure inside as opposed to outside a WWTP container or as a separate unit for the WWTP is that any WWTP utilizing such embodiments can be transported as a normal cargo transport container on trains, container ships and by truck with no additional requirements. This headwork's encapsulation can save many thousands of dollars in installation, upgrade and maintenance transport fees. Furthermore, structures 300 and 350 may be installed on any suitable side of the host WWTP container. For example, instead of installing structure 300 on the top of a WWTP container, it may be installed on a side wall of the WWTP container, allowing for a stacked WWTP container configuration as described below.

Figure 4:
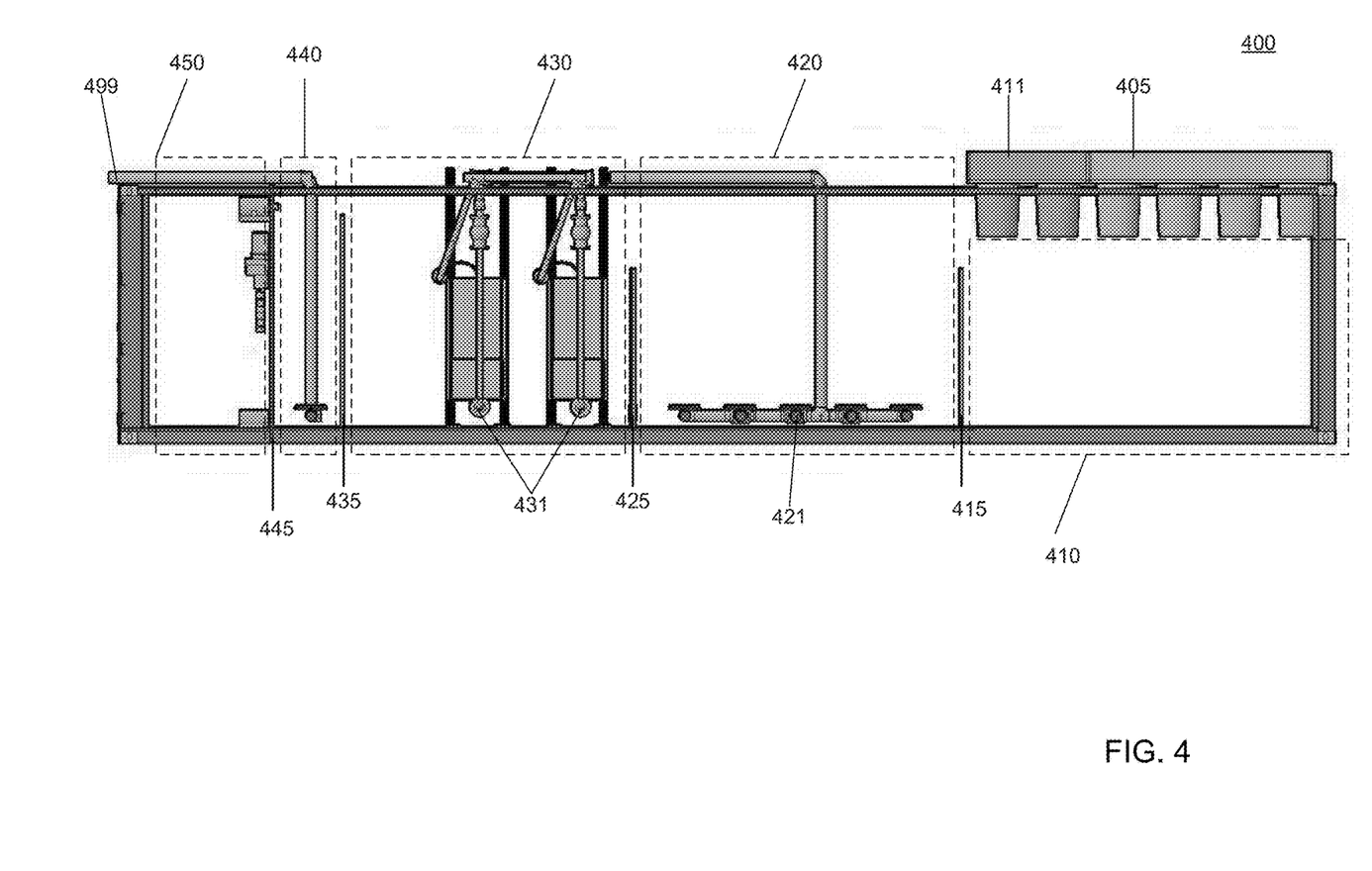
FIG. 4 is a diagram of a dynamically configurable and controllable wastewater treatment container having a plurality of basin compartments according to an embodiment of the disclosure.

FIG. 4 is a diagram of a dynamically configurable and controllable wastewater treatment container having a plurality of basin compartments according to an embodiment of the disclosure. In this embodiment, modular container 400 includes a plurality of wastewater treatment compartments, each executing a specific wastewater treatment function.

In this embodiment, modular container 400 receives wastewater from an influent source (e.g., a collection system) via headworks component 405 into anoxic compartment 410. In some embodiments, at the start of the wastewater purification process there is a requirement to remove all solids larger than a threshold value (e.g., 2 mm in diameter). This phase of treatment may be referred to as "headworks" processing. In this embodiment, headworks component 405 may comprise any of the example headworks and dewatering components discussed above. While shown to partially extend from modular container 400, other embodiments may have headworks component 400 contained completely (or almost completely) within container 400. Furthermore, while shown to be installed at the top of container 400, headworks component 400 may be installed in any of the side walls of the basin.

Devices positioned prior to the treatment stages of the waste water facility are generally considered to be within the definition of headworks and are sometimes referred to as the pretreatment section of the treatment facility.

When anoxic conditions are desired, anoxic compartment 410 may divert air away from the wastewater influent via outlet 411 in order to execute an anoxic process (e.g., de-nitrification of nitrates and nitrites). Modular container 400 further includes weir 415 disposed between anoxic compartment 410 and aeration compartment 420 (described below). In order for modular container 400 to execute a plurality of wastewater treatment functions, certain water levels may be maintained in various wastewater treatment processing compartments. It is also desirable to take advantage of "gravity flow" in order to reduce the number of mechanical pumps necessary to move water within the modular basin. Weir 415 may be utilized in embodiments of the invention to address this problem. In one embodiment, weir 415 is an overflow barrier that forms a controlled waterfall to alter the flow characteristics of wastewater transferred from anoxic compartment 410 to aeration compartment 420. In another embodiment, weir 415 is a modified pipe-weir. Said weir may be affixed to one of the interior walls of modular container 400, and may be lower in height or perforated with holes at the desired water level.

In the illustrated example embodiment, once anoxic compartment 410 is filled, the water overflows into adjacent aeration compartment 420 via weir 415. The wastewater remains at the weir wall height in anoxic compartment 410 in perpetuity, while the water level in aeration compartment 420 fluctuates as a function of the water coming into the anoxic compartment (i.e., wastewater received at input 405 of modular wastewater container 400).

Modular container 400 further includes aeration (i.e., pre-air) compartment 420 to deliver a suitable amount of air into the wastewater influent received from anoxic compartment 410 to promote aerobic reactions (e.g., a reaction taking place in the presence of oxygen) within the basin via, for example, air bubbles, compressed air streams, or any means to inject air into the wastewater influent. Said aerobic reaction may reduce the biochemical oxygen demand (BOD) and may further nitrify ammonia present in the wastewater influent to nitrate.

In this embodiment, aeration compartment 420 utilizes a mixer and coarse aeration bubble diffusers; aeration is supplied to aeration compartment 420 via positive displacement aeration pumps 421 to pump pipe air to the diffusers.

Weir 425 controls the flow of wastewater influent from aeration compartment 420 to MBR compartment 430. Weir 425 may comprise any embodiment similar to that of weir 415.

MBR compartment 430 executes both bio-reactive treatment processes with membrane separation processes. MBR compartment 430 uses membranes to separate and concentrate the biomass by removing wastewater (as opposed to using settling processes). Furthermore, said MBR compartment may retain particulate matter, remove a high percentage of pathogens, and remove dissolved materials from the wastewater influent.

Membranes utilized by MBR compartment 430 may be of any material (e.g., synthetic or natural) or porosity determined based on system requirements (e.g., quality requirements of the effluent). For example, said MBR compartment may utilize reverse osmosis, nanofiltration, ultrafiltration, microfiltration, or any other solid/liquid separation membranes known in the art. Said membranes may be of any configuration suitable for modular container 400 (e.g., sheet, hollow tube). In one embodiment, MBR compartment 430 utilizes polypropylene membrane filters comprising 0.4 micrometer pores.

In this embodiment, MBR compartment 430 includes air blowers 431 to provide aeration to the compartment to reduce BOD, convert ammonia to nitrate, and provide air scour to reduce fouling. Sodium hypochlorite may be pumped through the membranes of the compartment to prevent fouling of the membrane filters, and aluminum and magnesium sulfate may be fed into the MBR compartment to neutralize the pH levels of the wastewater influent.

Weir 435 controls the flow of wastewater influent from MBR compartment 430 to WAS compartment 440. Weir 435 may comprise any embodiment similar to that of weirs 415 and 425.

WAS compartment 440 may execute any solids processing means known in the art. In one embodiment, pipe 441 transfers WAS from container 400 for further processing (e.g., disposal, solids discharging, etc.) via effluent pipe 499.

Control compartment 450 may monitor the operation conditions of the various compartments of container 400, and may collect and transmit sensor data, manage the operation of the basin, bring the basin online or offline, etc. In this embodiment, liner wall 445 separates control compartment 450 from the wastewater treatment compartments described above.

The modular wastewater treatment basins described above allow for automated WWTP system planning and construction. Each individual basin may be uniformly constructed, stackable, and operable; enabling multiple WWTP system sites to have the same basin configurations, the same hardware, the same power and piping configurations, etc. Thus, a WWTP system site may be planned and designed based on a minimum amount of operating parameters.

As described above, in this illustrated embodiment modular container 400 receives wastewater from an influent source (e.g., a collection system) via headworks pipes 405 into anoxic compartment 410. In some embodiments, at the start of the wastewater purification process there is a requirement to remove all solids larger than a threshold value (e.g., 4 mm in diameter). This phase of treatment may be referred to as "headworks" processing. This processing may be executed in a standalone wastewater treatment container, or incorporated in a multi-function wastewater treatment container.

In some embodiments, a dewatering process is executed to remove the water from sludge. Dewatering can be characterized as the process of natural or mechanical removal of water from sludge during which sludge is losing its fluidity, becomes a damp solid and can be transported in bulk. The dewatering process may be executed in a standalone wastewater treatment container (e.g., container 100 of FIG. 1), or incorporated in a multi-function wastewater treatment container (e.g., container 400 of FIG. 4).

Figure 5:
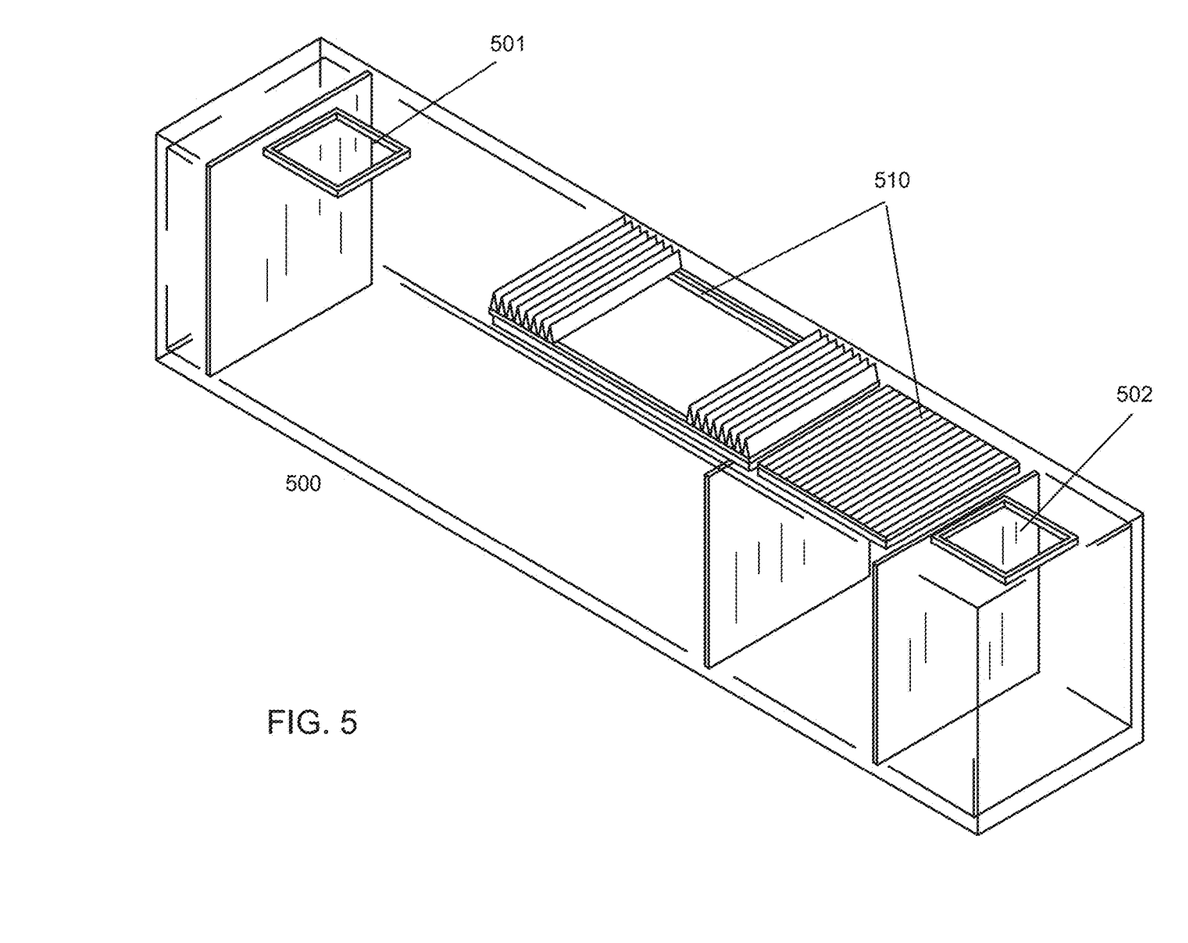
FIG. 5 is a diagram of a dynamically configurable and controllable wastewater treatment container configured to receive modular headworks and dewatering structures according to an embodiment of the disclosure.

FIG. 5 is a diagram of a dynamically configurable and controllable wastewater treatment container configured to receive modular headworks and dewatering structures according to an embodiment of the disclosure. In this embodiment, WWTP container 500 includes openings 501 and 502, for which headworks and dewatering structures (e.g., structures 200, 300 and 350 discussed above) may be received. Access doors 510 may be used to install other modular components for WWTP container 500. Thus, container 500 enables a modular design approach for a WWTP container by subdividing into smaller parts to receive (i.e., to have installed) various WWTP modular components, thereby increasing the efficiency of the manufacture and transport of WWTP solutions.

Figure 6:
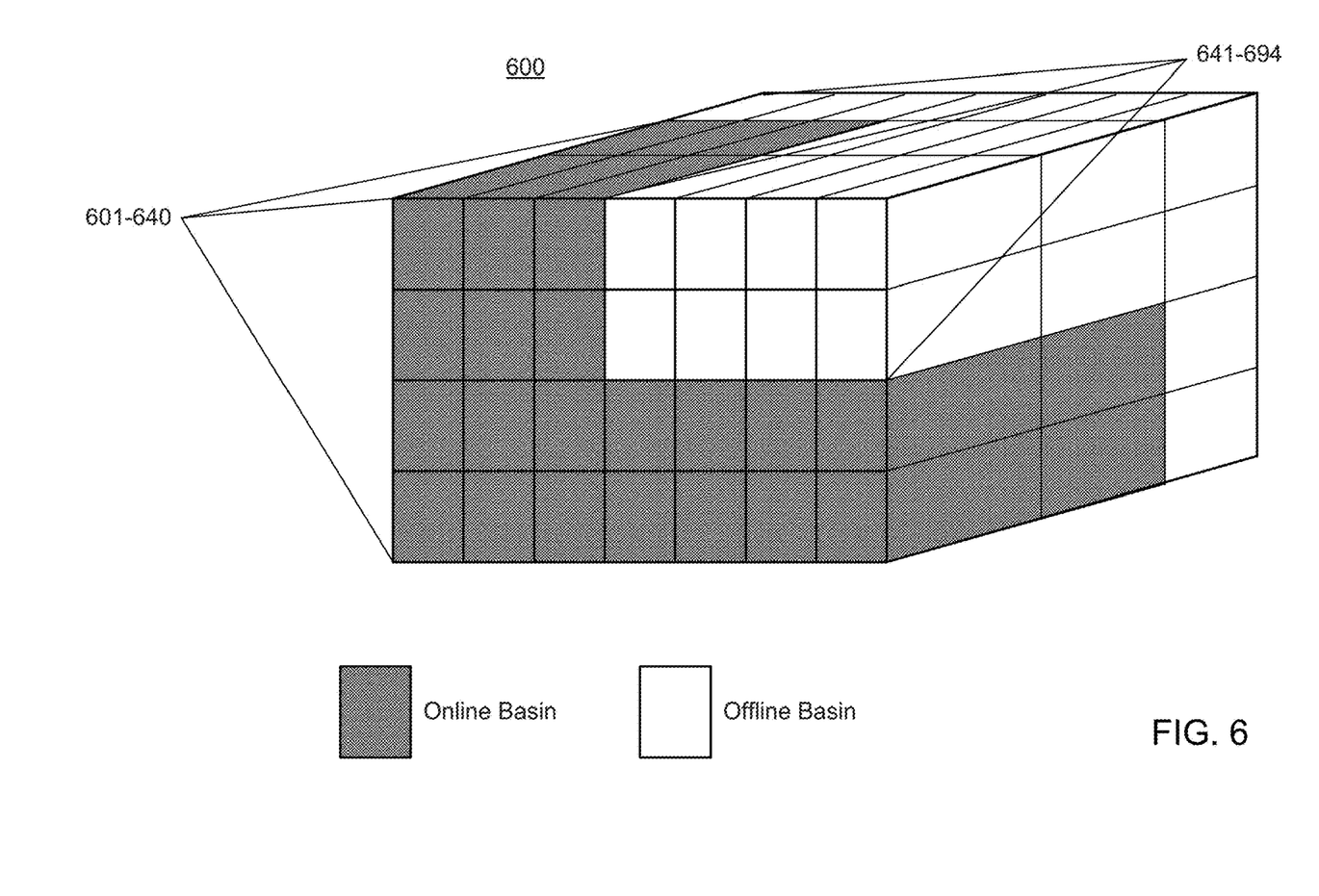
FIG. 6 is a block diagram of a plurality of modular wastewater treatment containers included in a wastewater treatment system according to an embodiment of the disclosure.

FIG. 6 is a block diagram of a plurality of modular wastewater treatment containers included in a wastewater treatment system according to an embodiment of the disclosure. In this embodiment, wastewater treatment system 600 includes plurality of containers 601-694. Said containers may be consistent with ISO specifications for intermodal containers as described above. In some embodiments, containers 601-694 act in concert to perform the same wastewater management function (e.g., containers 601-694 may function together as equalization basins, anoxic basins, etc.) or functions (e.g., containers 601-694 may each comprise a multi-function WWTP container, such as container 300 of FIG. 3). In other embodiments, said containers may each perform a separate function (e.g., some containers may function as an aeration tank while others containers may function as a membrane basin), or may each perform a plurality of functions. In some embodiments, containers 601-694 may be utilized to form an entire WWTP, while in other embodiments said containers may augment a prior art wastewater treatment system.

In the illustrated embodiment, containers 601-640 are shown as being in an "online" state; for example, containers 601-640 may be configured to perform the function of an equalization basin, and thus are "online" to receive wastewater input flow for system 600. Containers 641-694 are shown as being in an "offline" state; for example, containers 641-694 are configured so they cannot receive wastewater input flow for system 600. In other words, as illustrated in this example containers 601-694 may represent the potential capacity of system 600, but system 600 has an actual capacity represented by containers 601-640.

In some embodiments, containers 601-694 each include embodiment headworks and dewatering components installed within the container, to allow for the "stacking" of said containers. In other embodiments, containers 601-694 are extremely close in proximity, but do not abut each other as shown in the figure.

A control module or logic may monitor the wastewater input (i.e., influent) flow of system 600, and determine whether the capacity of online containers 601-640 is higher than the input flow; if the input flow is higher, some of offline-basins 641-694 are brought online to increase the operational capacity of system 600. Thus, the expansion of system 600 may be incremental, with no additional construction to the WWTP required. The control module or logic may configure the capacity of system 600 in response to any system level event or operating parameter that may require the operational capacity of system 600 to be increased, such as a significant increase in input flow, changes to the input/output water quality of system 600, a determination that at least one of online containers 601-640 is malfunctioning, overflow/underflow conditions, etc.

As described above, in some embodiments of the invention a modular wastewater treatment container is to include a plurality of basins. Said containers may utilize weirs to form these basins (alternatively referred to herein as "basin components.") In order for a modular wastewater treatment container to include a plurality of basin compartments that separately perform a wastewater treatment function, certain water levels should be maintained in the various compartments. It is also desirable to take advantage of "gravity flow"

in order to reduce the number of mechanical pumps necessary to move water around within the modular wastewater treatment container.

Thus, embodiments of the invention describe a headworks and dewatering component coupled to an inlet and disposed above a base of the basin, the headworks and dewatering component to include a filtration element to define a flow restriction for solid materials, dewater the solid materials from the wastewater influent, and pass a remainder of the wastewater influent (e.g., to another compartment of a host WWTP container). In one embodiment, the headworks and dewatering component comprises a rectangular shape (i.e., orthogonal polyhedral). In other embodiments, said component may comprise a circular or free-form shape. In one embodiment, the filtration element defines a flow restriction for solid materials based, at least in part, on dimensions of the solid materials. Said filtration element may comprise fabric netting, or metal mesh netting.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. An apparatus comprising:
a wastewater treatment container;
a basin included in the wastewater treatment container, the basin including a base, a plurality of side walls, a first basin compartment, and a second basin compartment, the first basin compartment configured to execute an anoxic process to divert air away from the wastewater treatment influent, the second basin compartment configured to execute an aeration process to deliver an amount of air into the wastewater treatment influent from the first basin compartment to promote aerobic reactions within the second basin compartment, a weir being disposed between the first basin compartment and the second basin compartment, the weir configured to alter flow characteristics of the wastewater treatment influent as it is transferred over the weir from the first basin compartment into the second basin compartment;
a corrosion resistant liner coupled to interior portions of each of the base and side walls of the basin;
a headworks and dewatering component received into an opening disposed at the top or a side of the first basin compartment, the headworks and dewatering component having a component inlet for receiving the wastewater treatment influent and a component outlet through which the anoxic process to divert the air away from the wastewater treatment influent is executed, the component inlet and component outlet having a side-by-side arrangement in the headworks and dewatering component, the headworks and dewatering component having a porous side supporting a removable filtration element, the component inlet defining a flow restriction for solid materials into the first basin compartment, dewatering the solid materials from the wastewater influent, and passing a remainder of the wastewater influent into the first basin compartment, the wastewater treatment influent to be transferred over the weir from the first basin compartment into the second basin compartment; and
an outlet to output wastewater treatment process material from the basin.

2. The apparatus of claim 1, the headworks and dewatering component comprising:
a gravitational bottom; and
one or more sidewalls including the filtration element.

3. The apparatus of claim 2, wherein the headworks and dewatering component includes an open side comprising the component inlet.

4. The apparatus of claim 1, wherein the filtration element defines the flow restriction for the solid materials based, at least in part, on dimensions of the solid materials.

5. The apparatus of claim 1, wherein the filtration element comprises fabric netting.

6. The apparatus of claim 1, wherein the filtration element comprises metal mesh netting.

7. The apparatus of claim 1, wherein the container is consistent with an International Organization for Standardization (ISO) specification for intermodal containers.

8. The apparatus of claim 1, wherein the weir is perforated with holes at a desired water level.

9. The apparatus of claim 1, wherein a porosity of the porous side corresponding to the component inlet has a different level of porosity than a porosity of the porous side corresponding to the component outlet.

10. The apparatus of claim 1, wherein the component inlet comprises a larger fraction of the headworks and dewatering component than the component outlet.

11. The apparatus of claim 1, wherein the executing of the anoxic process includes lowering nitrate levels of the wastewater treatment influent via the component outlet.

12. The apparatus of claim 1, wherein a structure of the headworks and dewatering component includes a physical separator between the component inlet and the component outlet and adapts the headworks and dewatering component to fit within the opening as a modular component of the wastewater treatment container.

13. A system comprising:
a wastewater treatment container;
a basin included in the wastewater treatment container, the basin including a base, a plurality of side walls, a first basin compartment, and a second basin compartment, the first basin compartment executing an anoxic process to divert air away from the wastewater treatment influent, the second basin compartment executing an aeration process to deliver an amount of air into the wastewater treatment influent from the first basin compartment to promote aerobic reactions within the second basin compartment, a weir being disposed between the first basin compartment and the second basin compartment, the weir configured to alter flow characteristics of the wastewater treatment influent as it is transferred over the weir from the first basin compartment into the second basin compartment;
a headworks and dewatering component received into an opening disposed at the top or side of the first basin compartment, the headworks and dewatering component having a component inlet for receiving the wastewater treatment influent and a component outlet through which the anoxic process to divert the air away from the wastewater treatment influent is executed, the component inlet and component outlet having a side-by-side arrangement in the headworks and dewatering component, the headworks and dewatering component including a porous side supporting a removable filtration element, the component inlet defining a flow restriction for solid materials into the first basin compartment, dewatering the solid materials from the wastewater influent, and passing a remainder of the wastewater influent into the first basin compartment, the wastewater treatment influent to be transferred over the weir from the first basin compartment into the second basin compartment; and
an outlet to output wastewater treatment process material.

14. The system of claim 13, the headworks and dewatering component comprising:
a gravitational bottom; and
one or more sidewalls including the filtration element.

15. The system of claim 14, wherein the headworks and dewatering component includes an open side comprising the component inlet.

16. The system of claim 13, wherein the filtration element defines the flow restriction for the solid materials based, at least in part, on dimensions of the solid materials.

17. The system of claim 13, wherein the filtration element comprises fabric netting.

18. The system of claim 13, wherein the filtration element comprises metal mesh netting.

19. The system of claim 13, wherein the side-by-side arrangement results in the wastewater treatment influent flowing in a first direction and the air flowing in a second direction, the first direction being opposite to the second direction.

20. The system of claim 13, wherein the headworks and dewatering component includes a plurality of sub-containers, a first group of the plurality of sub-containers being used as the component inlet and a second group of the plurality of sub-containers being used as the component outlet.

21. The system of claim 20, wherein each of the plurality of sub-containers is removable.

22. the system of claim 20, wherein a physical separator separates the first group of the plurality of sub-containers from the second group of the plurality of sub-containers.

23. The system of claim 20, wherein the first group is larger than the second group.

24. The system of claim 20, wherein each of the plurality of sub-containers has a removable lining.

* * * * *

UNITED STATES PATENT AND TRADEMARK OFFICE
CERTIFICATE OF CORRECTION

PATENT NO. : 10,221,084 B1
APPLICATION NO. : 13/605382
DATED : March 5, 2019
INVENTOR(S) : Reilly et al.

Page 1 of 1

It is certified that error appears in the above-identified patent and that said Letters Patent is hereby corrected as shown below:

On the Title Page

On page 2, in Column 2, under "Other Publications", Line 9, delete "2016" and insert --2015-- therefor On page 2, in Column 2, under "Other Publications", Line 29, delete "2018" and insert --2016-- therefor In the Specification In Column 2, Line 39, delete "June." and insert --June-- therefor In Column 3, Line 11, delete "100" and insert --110-- therefor In Column 5, Line 3, delete "30 and 350," and insert --300 and 350,-- therefor In Column 6, Line 1, delete "400" and insert --405-- therefor In Column 6, Line 4, delete "400" and insert --405-- therefor In Column 7, Line 22, delete "441" and insert --499-- therefor In the Claims In Column 11, Line 32, in Claim 13, delete "which-the" and insert --which the-- therefor In Column 12, Line 33, in Claim 22, delete "the" and insert --The-- therefor Signed and Sealed this
Twelfth Day of January, 2021

Andrei Iancu
*Director of the United States Patent and Trademark Office*